United States Patent [19]
Brotto

[11] Patent Number: 6,020,721
[45] Date of Patent: *Feb. 1, 2000

[54] INDIRECT THERMAL SENSING SYSTEM FOR A BATTERY CHARGER

[75] Inventor: Daniele C. Brotto, Baltimore, Md.

[73] Assignee: Black & Decker Inc., Newark, Del.

[ * ] Notice: This patent is subject to a terminal disclaimer.

[21] Appl. No.: 09/224,546

[22] Filed: Dec. 31, 1998

Related U.S. Application Data

[63] Continuation of application No. 08/834,375, Apr. 16, 1997, Pat. No. 5,874,825.
[60] Provisional application No. 60/017,404, May 3, 1996.

[51] Int. Cl.[7] ........................................................ H02J 7/00
[52] U.S. Cl. ............................. 320/150; 324/441; 429/62
[58] Field of Search ..................................... 320/150, 151, 320/152; 324/441; 429/62

[56] References Cited

U.S. PATENT DOCUMENTS 5,874,825  2/1999  Brotto ................................... 320/150

*Primary Examiner*—Peter S. Wong
*Assistant Examiner*—K. Shin
*Attorney, Agent, or Firm*—Harness, Dickey & Pierce, P.L.C.

[57] ABSTRACT

A battery charger including a battery temperature monitoring device. The battery temperature monitoring device includes a first thermistor bonded to one of the terminals of the battery charger to provide a temperature signal of the temperature of the terminal, and a second thermistor positioned within the battery charger to provide a temperature signal of the ambient temperature. The temperature signals from both the first and second thermistors are applied to a temperature monitoring circuit that compares the temperature signals to a known discharge rate of an RC circuit. A microprocessor receives output signals from the temperature monitoring circuit and, using an algorithm, determines the actual temperature of the battery.

2 Claims, 2 Drawing Sheets

INDIRECT THERMAL SENSING SYSTEM FOR A BATTERY CHARGER

CROSS REFERENCE TO RELATED APPLICATIONS

This is a continuation of U.S. Pat. application No. 08/834,375, filed Apr. 16, 1997, now U.S. Pat. No. 5,874,825 issued Feb. 23 1999.

This application is related to United States Provisional Application Ser. No. 60/017,404, filed May 3, 1996.

FIELD OF THE INVENTION

The present invention relates to a device for monitoring battery temperature during charging of an electrical battery or battery pack. More particularly, the present invention relates to a device for monitoring battery temperature during charging of a battery pack including measuring a battery terminal temperature and a battery charger ambient temperature using an analog-to-digital conversion technique.

BACKGROUND OF THE INVENTION

It is known in the prior art to monitor a parameter associated with the charging condition of battery packs in order to terminate charging as soon as a full level of charge is reached. This prevents battery packs from being damaged and thus prolongs their service life. Continued charging of the battery pack beyond the full charging level may have serious disadvantages for all types of batteries, especially the nickel-cadmium batteries.

A number of different systems are known in the art to detect full battery charge in a charging system. One method of determining full charge is by monitoring the temperature of the battery pack. These types of systems, however, suffer the drawbacks of repeated repetition of high temperature, low charging efficiency, and problems with safety in defective cells. A second type of charging system uses a voltage cutoff technique. These types of systems have proved to be unsatisfactory in that temperature variations lead to large voltage variations, and thus, an inaccurate full charge determination. Another type of charging system incorporates the termination of the charging as a function of the time of charging. These types of systems have been unreliable in that it is difficult to accurately tell what the state of the charge of the battery pack is at the initiation of the charging sequence A more reliable method of charging has been disclosed in which the charging device monitors the slope of the voltage-time curve for a particular battery. Since the voltage-time charging curve for a particular battery will always be substantially the same, it is possible to determine different points on the curve which represent different points in the charging sequence, and thus it is possible to determine which point of the curve represents full charge.

A quick charging system incorporating a type of slope monitoring technique is disclosed in U.S. Pat. Nos. 4,388,582 and 4,392,101, both to Saar et al. The Saar et al. patents disclose a quick charging technique which analyzes the charging of a battery by noting inflection points which occur in the curve as the electrochemical potential within the battery changes with respect to time. By determining specific inflection points in the charging curve, it is possible to accurately terminate the rapid charging when the battery receives full charge.

The inflection point type analysis can be illustrated by viewing FIG. 1. FIG. 1 is a typical voltage-time curve of a nickel-cadmium ("Ni-Cad") battery. As is apparent, the voltage continuously rises as the charging time increases until it gets to a maximum charge point. Although the specific values of the curve may differ from battery to battery, the general shape of the curve is typical for all nickel-cadmium batteries. Further, every type of rechargeable battery will have a voltage-time curve indicative of its type.

As is apparent, the curve can be separated into five distinct regions. Region I represents the beginning of the charging sequence. In this region, the voltage characteristics are somewhat unreliable and may vary from battery to battery in accordance with its prior history of being charged and discharged. It is for this reason that region I is shown as a dotted line. Further, this region is not important in the charging sequence since it is generally traversed within a relatively short period of time after the start of the charging sequence.

After approximately 30 to 60 seconds of starting the charging sequence, the charging curve will enter the more stable region of region II. Region II is generally the longest region of the charging sequence, and is marked by most of the internal chemical conversion within the battery itself. As is apparent, the voltage of the battery does not increase substantially over this region. At the end of region II is an inflection point A in the curve. Inflection point A represents a transition from region II to region III and is noted by a point where the slope of the curve changes from a decreasing rate to an increasing rate.

Region III is the region in which the battery voltage increases quite rapidly. As the battery reaches its fully charged condition, the internal pressure and temperature of the battery also increase substantially. When these effects begin to take over, the increase in battery voltage begins to taper off. This is noted as the inflection point B.

Region IV represents the fully charged region between inflection point B and the peak of the curve represented by point C. The voltage only stabilizes at point C for a short period of time. If charging continues, the additional heating within the battery will cause the voltage of the battery to decrease and, in addition, may damage the battery.

By analyzing the inflection points of the voltage-time curve, it can be determined at what point the battery has reached maximum charge This is done by first determining inflection point A and then looking for inflection point B. Once inflection point B is observed, the charging process can be discontinued. Since it is possible to determine the inflection points very readily and accurately, it is possible to halt the charging process, or maintain the charging process at a maintenance charge, following detection of the second inflection point.

A battery charging system which incorporates the above-described analysis of the voltage-time curve of a rechargeable battery is described in U.S. Pat. No. 5,352,969, assigned to the assignee of the present invention and herein incorporated by reference. The system described in the U.S. Pat. No. 5,352,969 patent is capable of charging batteries of different voltages on the same charger. A typical battery charger which can incorporate the charging system shown in the U.S. Pat. No. 5,352,969 patent is shown in U.S. Pat. No. 5,144,217. These types of battery chargers and others incorporating the voltage-time curve analysis also incorporate a temperature monitoring system for the protection of the batteries and the charging system in general. The temperature monitoring systems in general incorporate a temperature sensitive element, such as a thermistor, which must be brought into close association with or in contact with the battery cell.

One prior art technique for monitoring battery cell temperature consists of locating a thermistor during charging in a suitable recess in the battery pack in a position adjacent to one of the battery cells. This technique is somewhat inaccurate and thus unsatisfactory in practice since although the thermistor is located adjacent a battery cell, it may not be brought into contact with the battery cell. The thermistor, therefore, fails to detect the actual temperature of the battery cell, and instead detects the ambient temperature adjacent to the battery cell. The inaccurate battery cell temperature may lead to the overcharging of the battery or the battery pack.

Another version of these prior art battery charges requires the operator to position the thermistor on the battery pack at the time of charging the battery. If the operator forgets to position the thermistor or positions it incorrectly, the charging of the battery pack will continue until it is completely destroyed. Additional versions of these prior art chargers with temperature monitoring systems incorporate the thermistor in the structure of the battery pack during its manufacture. This not only increases the complexity and costs associated with each battery pack, it also requires that a correct connection be established between the battery charger and the thermistor when the battery pack is attached to the charger. An incorrect connection of the thermistor with the charger will lead to incorrect temperature information which will lead to the charging of the battery pack until it is destroyed. Moreover, in practice, it is found that the electrical connections of the thermistor or the thermistor itself deteriorate when the battery pack is in use, particularly when the battery pack is used with portable tools that vibrate.

An attempt has been made to obviate the disadvantages of these prior art battery chargers which rely on a thermistor in the structure of the battery pack by incorporating the thermistor as part of the charger and positioning the thermistor on one of the terminals of the charger which communicate with the battery pack being charged. A detection system can be incorporated into the charger such that when connection is detected between the thermistor and the rechargeable battery cell of the battery pack, the charging process is permitted. Otherwise, the charging process is prohibited.

While these later designs for battery chargers which include a thermistor on one of the charger terminals have successfully resolved some of the problems associated with charging battery packs, there are still some unresolved issues relating to these chargers. The positioning of the thermistor on the terminal of the charger only places the thermistor in relatively good thermally conductive relationship with the battery cells. The chain of this conductivity is through the terminal, to the battery pack terminal and to the battery cells themselves. Thus, the temperature being read by the thermistor is not the temperature of the battery cells. It is the temperature of the battery charger terminal which is being heated by the battery cells producing a time delay between the actual temperature of the battery cells and the temperature being sensed by the thermistor on the battery terminal.

Accordingly, what is needed is a technique for determining the actual temperature of the battery cells being charged using the output of a temperature sensing device, preferably a thermistor, which is a part of the battery charger and is preferably located on one of the terminals of the charge. This would provide the complexity and cost savings associated with having the temperature sensing element a part of the battery charger while simultaneously providing for an accurate determination of the temperature for the battery cells.

SUMMARY OF THE INVENTION

The present invention provides the art with a battery charger which includes a first temperature sensing element, preferably a thermistor, in intimate contact with one of the terminals of the battery charger. A second temperature sensing element, also preferably a thermistor, is positioned within the battery charger to sense ambient temperature. A temperature signal from both the first temperature sensing element and the second temperature sensing element are applied to an analog-to-digital conversion circuit. The analog-to-digital conversion circuit uses a known discharge rate of an RC circuit to convert the non-linear analog temperature signals into a linear digital equivalent. A microprocessor located within the charger receives output signals from the temperature monitoring circuit and, using an algorithm, approximates the actual temperature for the battery cells.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the invention.

DETAILED DESCRIPTION OF THE PREFERRED EMBODIMENT

The following description of the preferred embodiment directed to a battery monitor including a temperature monitoring system is merely exemplary in nature and is in no way intended to limit the invention or its applications or uses.

Figure 1:
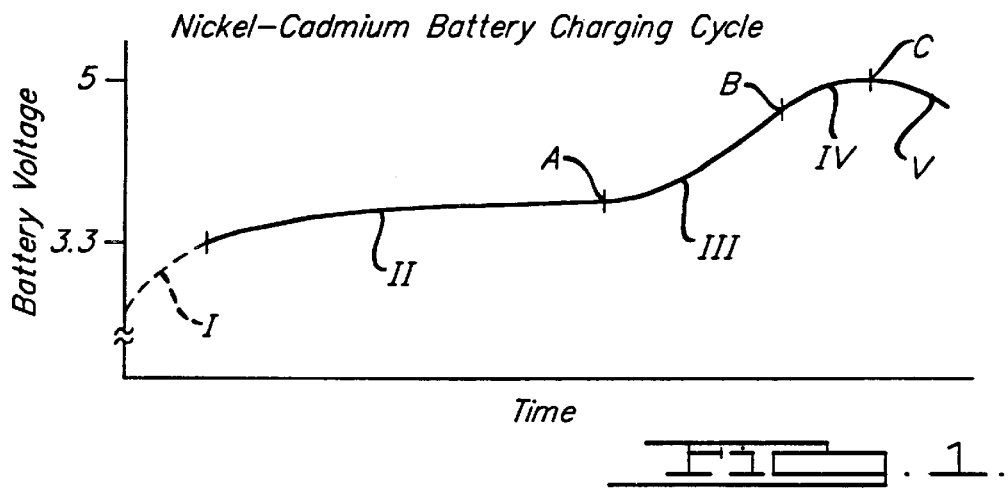
FIG. 1 is a graph showing battery voltage versus time for a charging sequence of a nickel-cadmium battery.

U.S. Pat. No. 5,352,969 mentioned above, and incorporated herein by reference, discloses a logarithmic analog-to-digital conversion technique to convert the analog battery voltage signal to a digital signal to be processed by a microprocessor. The range of rated voltages of battery packs used in different power tools varies depending on the number of cells in the pack. The actual voltage exhibited by different battery packs can vary beyond the rated voltage, for example, from less than one volt per cell to greater than two volts per cell. In order to provide adequate charge analysis resolution for all rated and actual voltages within this range during charging, the '969 patent uses a technique for automatically scaling the analog battery voltage signal to be within a specific range, regardless of the rated output voltage of the battery pack, in conjunction with the logarithmic analog-to-digital conversion technique. To accomplish this, the battery charger incorporates a prescaler circuit comprising a variable voltage attenuator circuit that is selectably settable by the microprocessor by a plurality of analog switching devices. Since the analog-to-digital conversion circuitry uses a constant reference voltage, such as five (5) volts, it is necessary to attenuate the battery voltage signal supplied to the analog-to-digital conversion circuitry to be less than the reference voltage. The prescaler circuit attenuates the voltage from the battery pack, and is selectively variable by the switching device to set the attenuated voltage to be at a steep part of a discharge curve of the analog-to-digital conversion circuit to increase accuracy. This attenuated voltage is about 3.3 volts in one example. Accordingly, regardless of the rated output voltage of the particular battery pack being charged, full charge will not exceed the reference voltage. Because modern battery charges are microprocessor controlled, it is necessary to convert the analog battery voltage signal to a digital signal to monitor the charging sequence to determine, for example, the inflection points in the charging curve of FIG. 1. The present invention proposes a much simplified analog-to-digital conversion circuitry to that disclosed in the '969 patent. However, the basic operation of the analog-to-digital converter circuit in the '969 patent is effectively the same as that discussed below, and thus the operation of that conversion circuit is applicable to this discussion.

Figure 2:
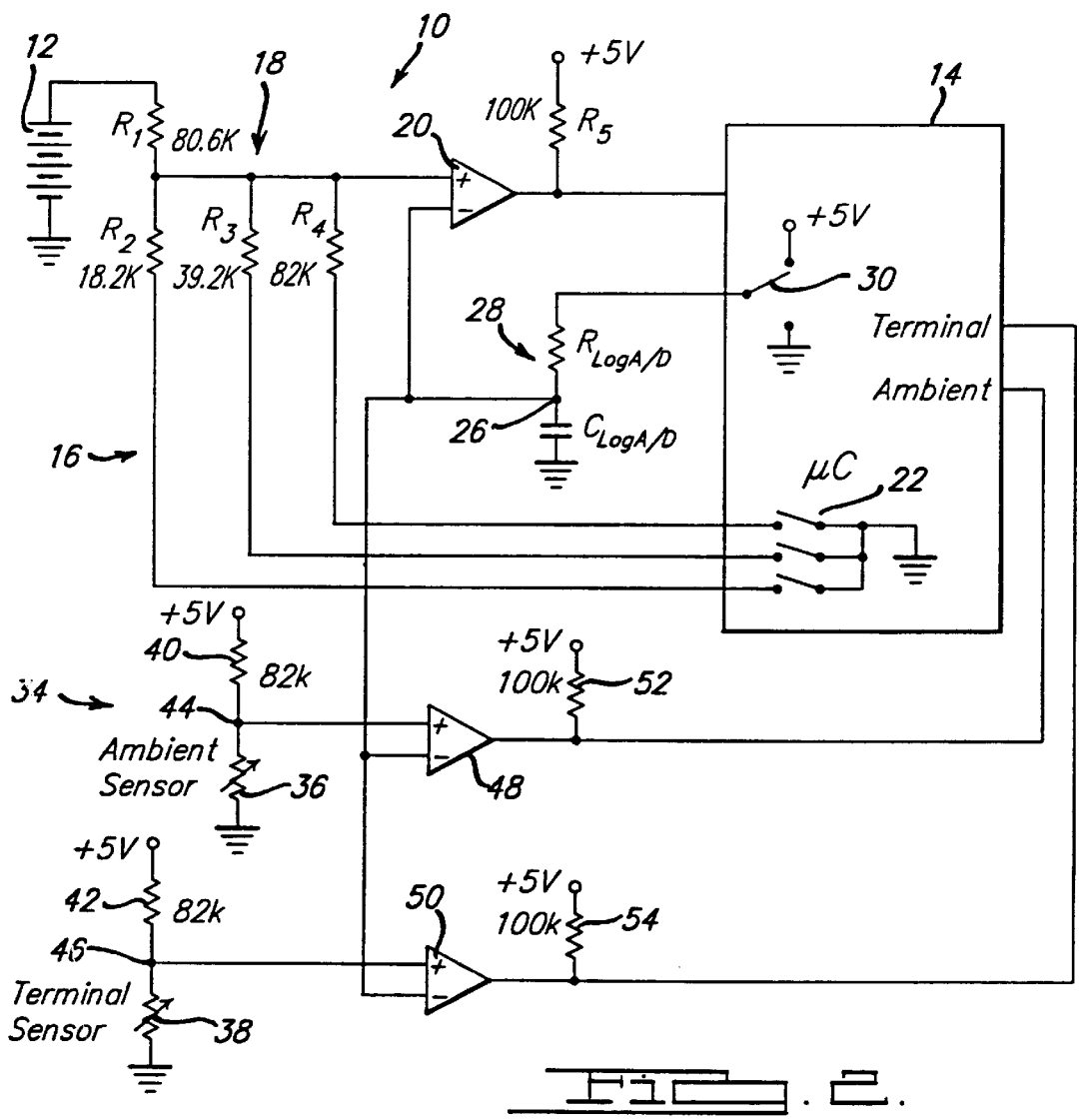
FIG. 2 is a schematic diagram of a battery monitoring circuit including a temperature monitoring system in accordance with the present invention.

FIG. 2 shows a battery monitoring circuit 10 that monitors the voltage and temperature of a battery pack 12 to be charged. The battery pack 12 includes a certain number of cells depending on the particular pack and can have various rated voltages. The circuit 10 is microprocessor controlled by a microprocessor 14. The actual charging circuitry is not shown in this figure, however, as will be understood by those skilled in the art, can be any suitable battery charging circuitry, such as discussed in the '969 patent, for the purposes of the present invention. The battery monitoring circuit 10 includes an analog-to-digital conversion circuit 16 that includes a prescaler 18 acting as a voltage divider network made up of resistors $R_1$, $R_2$, $R_3$, and $R_4$. The prescaler 18 attenuates the analog battery voltage signal depending on the value of the resistors $R_1$, $R_2$, $R_3$ and $R_4$ and which resistors are in the prescaler 18. The attenuated battery voltage signal from the battery pack 12 is applied to a positive terminal of a comparator 20. The resistors $R_1$, $R_2$, $R_3$, and $R_4$ are switched into and out of the prescaler 18 by a series of switches 22 internal to the microprocessor 14. When a switch 22 connected to a particular resistor is open, that resistor is connected to high impedance, and thus is taken out of the prescaler 18. If the particular switch 22 is closed, the resistor is connected to ground, and acts to help attenuate the battery voltage signal from the battery pack 12. To determine if a battery has in fact been placed in the charger, the microprocessor 14 closes all of the switches 22 for maximum attenuation.

The negative terminal of the comparator 20 is connected to a node 26 between a resistor $R_{LogA/D}$ and a capacitor $C_{LogA/D}$ of an RC circuit 28. An opposite terminal of the resistor $R_{LogA/D}$ from the node 26 is connected to an output pin of the microprocessor 14 which is internally connected to a switch 30. The switch 30 is connected to a suitable voltage potential, here five volts, or ground. When the switch 30 is switched to the plus five volt terminal, the capacitor $C_{LogA/D}$ is charged through the resistor $R_{LogA/D}$ until it is fully charged. Once the capacitor $C_{LogA/D}$ is fully charged, a voltage reading of the battery pack 12 can be taken by switching the switch 30 to the ground terminal. When the switch 30 is switched to the ground terminal, the capacitor $C_{LogA/D}$ begins to discharge at a rate depending on the value of the resistor $R_{LogA/D}$ and the capacitor $C_{LogA/D}$. At the same time as when the switch 30 is switched to ground, the microprocessor 14 starts a counter to count known clock pulses. When the capacitor $C_{LogA/D}$ has discharged to a voltage level that is less than the attenuated voltage level of the battery pack 12 applied to the positive terminal of the comparator 20, the comparator 20 will switch high causing a plus five volt potential to be applied to an input pin of the microprocessor 14 through a pull-up resistor $R_5$. When this happens, the microprocessor 14 stops counting the clock pulses, and stores the counted clock pulse value. This stored digital clock pulse count is the digital conversion of the analog voltage signal of the battery pack 12 as attenuated by the prescaler 18. Thus, depending on the configuration of the switches 22 establishing the attenuation of the prescaler 18, the microprocessor 14 can calculate the voltage of the battery pack 12 based on the discharge time of the capacitor $C_{LogA/D}$, and the values of the capacitor $C_{LogA/D}$ and the resistor $R_{LogA/D}$. A more detailed discussion of the operation of the analog-to-digital conversion circuit 16 can be found in the '969 patent.

The attenuation of the battery voltage signal from the battery pack 12 as established by the switches 22 is set to be approximately 3.3 volts so that the attenuated voltage measurements of the battery pack 12 are taken at an area of the discharge curve of the capacitor $C_{LogA/D}$ suitable for an increased signal to noise ratio, and is within the maximum voltage potential of the system. In other words, the attenuated voltage from the battery pack 12 cannot exceed the reference voltage or the comparator 20 will not indicate a high signal at the appropriate time. It is preferred that the attenuated voltage be at the steeper part of the discharge curve where the voltage of the capacitor $C_{LogA/D}$ is changing more rapidly for increased accuracy.

Figure 3:
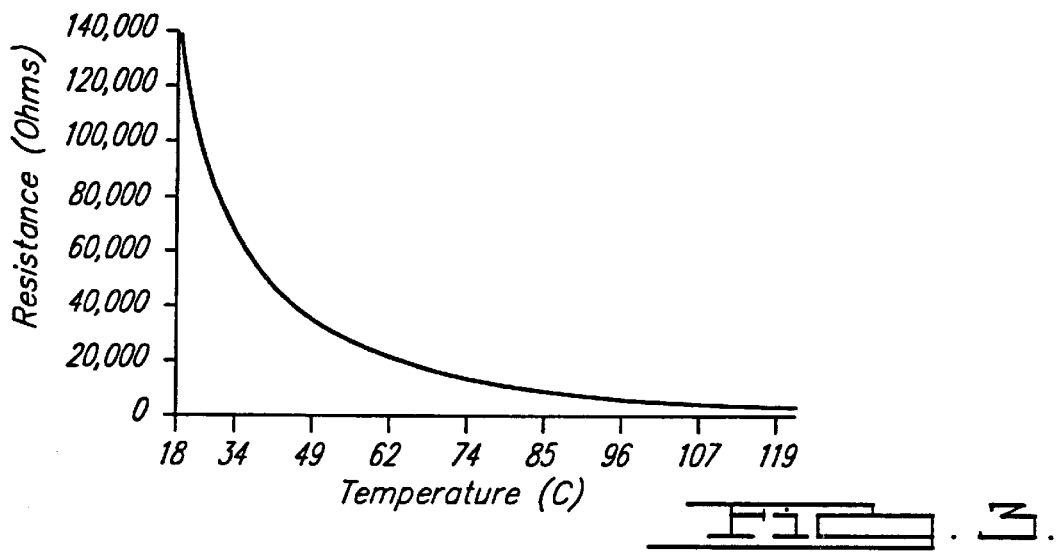
FIG. 3 is a graph showing thermistor resistance versus temperature.

The battery monitor circuit 10 also includes a temperature check circuit 34 according to the present invention. The temperature check circuit 34 includes a thermistor 36 that acts as a temperature sensor to measure ambient temperature within the battery charger, and a thermistor 38 that acts as a temperature sensor to measure terminal temperature of a battery charger terminal. In the embodiment being discussed herein, the thermistor 38 is physically bonded to the negative terminal of the battery charger. However, in an alternate embodiment, the thermistor 38 can be attached to either the positive or negative terminal of the battery charger. As is well understood in the art, thermistors are temperature sensitive devices whose resistance changes with respect to temperature. Other types of temperature sensing devices suitable for determining the ambient temperature of the battery charger and the temperature of the battery charger terminal can be used in place of the thermistors 36 and 38 within the scope of the present invention. FIG. 3 is a graph of temperature on the horizontal axis and resistance on the vertical axis to show the relationship of the resistance of a thermistor to temperature. As is apparent from this graph, this relationship is not linear.

Figure 4:
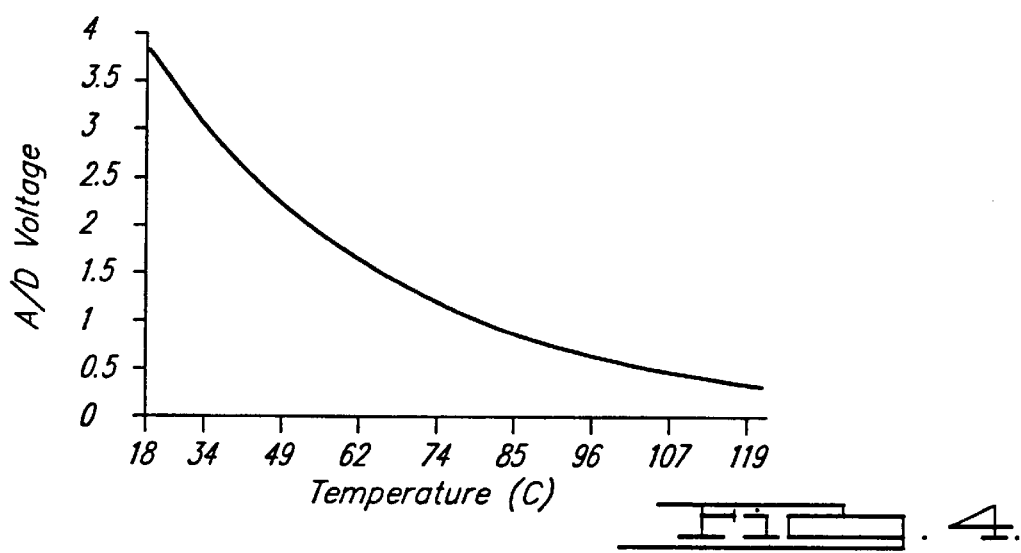
FIG. 4 is a graph showing analog-to-digital voltage versus temperature.

A resistor 40 is provided in series with the thermistor 36, and a resistor 42 is provided in series with the thermistor 38. The combination of the resistor 40 and the thermistor 36 makes up one voltage divider network, and the combination of the resistor 42 and the thermistor 38 make up another voltage divider network. The voltage divider networks divide a five volt potential applied to a terminal of the resistors 40 and 42 opposite to the thermistor 36 and 38, respectively. Both the resistors 40 and 42 are 82 k ohm resistors for the purposes of the present invention. However, as will be appreciated by those skilled in the art, this value may vary from battery charger to battery charger. The voltage at a node 44 between the resistor 40 and the thermistor 36, and the voltage at a node 46 between the resistor 42 and the thermistor 38 is a voltage divided analog temperature signal to be converted to a digital signal. The voltages at the nodes 44 and 46 change as the temperature of the thermistors 36 and 38 changes. This relationship with respect to temperature is given in the graph represented in FIG. 4, where the A/D voltage is given on the vertical axis and the temperature is given on the horizontal axis.

The voltage signal at the node 44 is applied to a positive terminal of a first comparator 48. Likewise, the voltage signal at the node 46 is applied to a positive terminal of a second comparator 50. An output of the first comparator 48 is applied to an ambient sensor input of the microprocessor 14, and an output of the second comparator 50 is applied to a charger terminal input of the microprocessor 14. The combination of the thermistor 36, the resistor 40 and the first comparator 48 makes up an ambient temperature sensing portion of the temperature check circuit 34, and the combination of the thermistor 38, the resistor 42, and the second comparator 50 makes up a charger terminal sensing portion of the temperature check circuit 34.

To determine the ambient and charger terminal temperatures, the microprocessor 14 applies a five volt potential to the RC circuit 28 through the switch 30. The capacitor $C_{LogA/D}$ in the RC circuit 28 is charged through the series resistor $R_{LogA/D}$ by the five volt potential. Once the capacitor $C_{LogA/D}$ is charged, the five volt potential from the microprocessor 14 is applied to the negative terminal of both the comparators 48 and 50 through node 26. As the ambient temperature varies, the resistance of the thermistor 36 will vary, thus altering the potential applied to the positive terminal of the comparator 48. For example, as ambient temperature goes up, the resistance of the thermistor 36 goes down, increasing the voltage potential applied to the positive terminal of the comparator 48. Likewise, as the ambient temperature goes down, the resistance of the thermistor 36 goes up, reducing the voltage potential applied to the positive terminal of the comparator 48. Therefore, the potential applied to the positive terminal of the comparator 48 is determined by the ambient temperature in the battery charger. The voltage potential applied to the positive terminal of the comparator 50 changes in the same way with respect to changes in the battery terminal temperature as sensed by the thermistor 38.

When the switch 30 is closed and is applying the five volt potential to the RC circuit 28 and the capacitor $C_{LogA/D}$ is charged, the potential on the negative terminals of the comparators 48 and 50 will always be greater than the potential on the positive terminals of the comparators 48 and 50 because of the voltage divider networks. Therefore, the output of the comparators 48 and 50 will be low, and thus a low signal will be applied to the microprocessor 14 at the ambient sensor input and the battery charger terminal input. When the microprocessor 14 is instructed to take a temperature reading, it will switch the switch 30 to ground eliminating the five volt potential applied to the capacitor $C_{LogA/D}$. When a ground potential is applied to the RC circuit 28, the capacitor $C_{LogA/D}$ will begin to discharge through the resistor $R_{LogA/D}$, and the voltage potential applied to the negative terminals of the comparators 48 and 50 will begin to decrease. Eventually, the potential applied to the negative terminal of the comparators 48 and 50 will fall below the potential applied to the positive terminals of the comparators 48 and 50 as determined by the resistances of the thermistors 36 and 38 and the discharge characteristics of the capacitor $C_{LogA/D}$. When this occurs, the output of the comparators 48 and 50 will become high impedance. Of course, unless the ambient temperature and the charger terminal temperature are the same, the output of the comparators 48 and 50 will not go high impedance at the same time. When the output of the comparators 48 and 50 are high impedance, a five volt potential applied to the ambient sensor input and the charger terminal sensor input to the microprocessor 14 as applied through 100 k resistors 52 and 54 will cause the inputs to go high.

When the microprocessor 14 switches the switch 30 to the ground potential, an internal counter within the microprocessor 14 begins incrementing at a known clock frequency to time the discharge of the capacitor $C_{LogA/D}$. A separate internal counter can be used for both the ambient temperature and the battery terminal temperature. When the capacitor $C_{LogA/D}$ discharges to a level that causes the output of the comparators 48 and 50 to go high impedance, as determined separately at the ambient sensor input and the charger terminal sensor input, the microprocessor 14 will stop counting and use the accumulated count values to determine the temperatures of the thermistors 36 and 38, and thus the ambient temperature and the charger terminal temperature. Since the discharge time constant of the RC circuit 28 is known, and the clock rate of the microprocessor's clock is known, a predetermined relationship exists between the number of accumulated counts and the discharge level of the capacitor $C_{LogA/D}$. In one embodiment, the accumulated count value is applied to a preset look-up table in the microprocessor 14 to give the temperature values.

Figure 5:
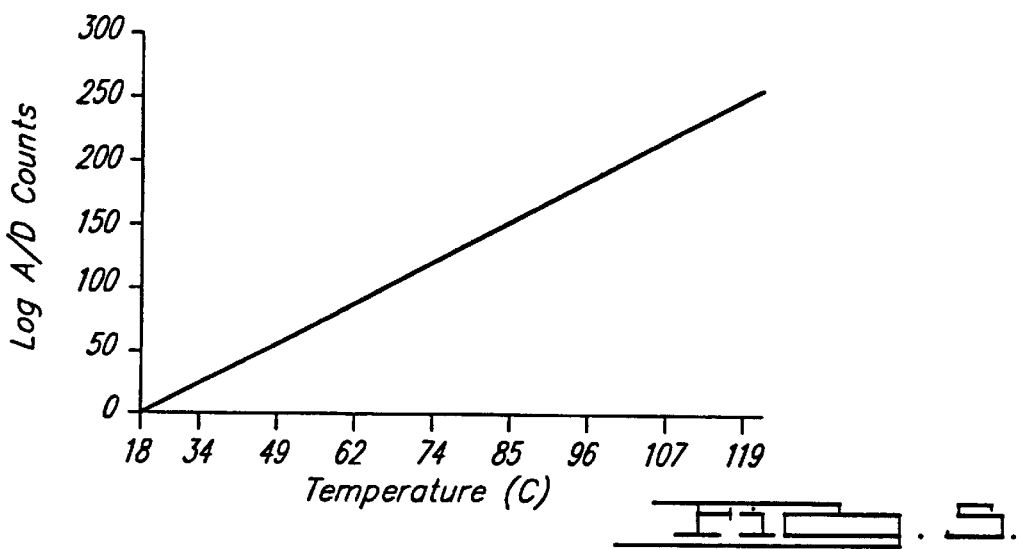
FIG. 5 is a graph showing logarithmic analog-to-digital counts versus temperature.

Because the A/D voltage potential applied to the positive terminal of the comparators 48 and 50 is not linear with respect to temperature, a proportional number of counts does not give a proportional change in temperature throughout the range of temperatures sensed by the thermistors 36 and 38. In other words, fifty counts may represent a temperature of 50° C., but one hundred counts will not represent 100° C. By applying the non-linear A/D voltage potential to the positive terminals of the comparators 48 and 50 and the discharge voltage of the RC circuit 28 to the negative terminals of the comparators 48 and 50, the counts generated by the microprocessor 14 during the discharge of the RC circuit 28 provides a linearization of the analog signal representing the temperatures to digital counts. This relationship is shown in FIG. 5 as temperature on the horizontal axis and log A/D counts on the vertical axis.

In one embodiment, the practical temperature range of the ambient battery charger temperature and the battery charger terminal temperature is between 13 and 105° C. Using an 8 bit counter in the microprocessor 14 generates 0–255 counts for this range of temperature. Therefore, the resolution of the temperature can be given as 255 counts divided by the number of degrees in the range.

According to one embodiment of the invention, the temperature of the battery pack 12 is determined in the following manner. The charger terminal temperature is monitored before the battery pack 12 is inserted into the battery charger, and its value is represented as $T_0$. After the battery pack 12 is inserted into the battery charger, subsequent charger terminal temperature readings with the battery pack 12 in contact with the terminal are represented as $T_1$. The ambient temperature within the battery charger is also monitored during the charging process, and this value is represented as $T_A$. After an elapse of a suitable time period following the insertion of the battery pack 12 into the charger to allow stabilization of the thermal system, for example one minute, the microprocessor 14 calculates $T_{BATT}$ to determine the temperature of the cells in the battery pack 12 by the following equation.

$$T_{BATT} = C_1 T_1 + C_2 T_0 + C_3 T_A + C_4$$

The coefficient $C_1$, $C_2$, $C_3$ and $C_4$ are selected to provide the most accurate response for the battery cell temperatures in a particular situation. These coefficients can be derived by experimental procedures and a linear curve fit mathematical technique. For a particular embodiment disclosed herein, $C_1=2.25$ $C_2=-0.625$, $C_3=-0.5$ and $C_4=-4$.

The equation above provides a suitable transfer function to provide a model to accurately estimate battery temperature. With the temperature of the battery pack 12 known, the battery charger can direct the charging process while monitoring battery temperature. For example, the battery charger may include a cool-down period for excessively high battery packs and/or adaptive charge termination schemes based on battery pack temperatures at the beginning of the charge cycle. The monitoring circuit 10 will continue monitoring temperature until the battery pack 12 does cool down. In addition, the controller can ensure that critical temperature levels are not exceeded during the charging process.

As discussed above, the temperature check circuit 34 uses a thermistor, the thermistor 36, bonded to the negative battery contact to determine battery contact temperature. The thermistor 36 is connected to the temperature check circuit 34 by a fine gauge wire. If the wire to the thermistor 36 were to break, the overtemperature system of the circuit 34 would be disabled, and the system would default to a battery cool position even if the battery was hot, possibly too hot to be charged. Thus, it is desirable to provide some type of fail-safe design that enables a broken thermistor wire to be detected. According to one aspect of the present invention, such a system is provided, where the system defaults to a "broken wire" condition if no indication of an "intact" wire is reached within a predetermined time of the beginning of charging. The system then suspends charging current and enters a "problem mode" for example, a blinking LED. In a preferred example, this predetermined time interval is twenty minutes. Of course, twenty minutes is used in a preferred embodiment, but as will be appreciated by those skilled in the art, other time limits will also be applicable within the scope of the invention.

The thermistors 36 and 38 are limited in temperature sensing range, in one embodiment from 13° C. (55° F.) to 105° C. (221° F.). If the thermistor wire breaks, then for the next charging sequence, the thermistor temperature reading locks to 13° C. However, the system does not know if the thermistor wire has broken, or the negative terminal is actually less than 13° C. If a hot battery is placed in a charger, and is not allowed to properly cool prior to charging, degrade performance of battery could exist by continually recharging a hot battery. Thus, if the thermistor wire is broken, the possibility exists that a hot battery inserted into the charger would not be detected because the terminal temperature thermistor would read cool.

The present invention proposes determining if the thermistor wire is broken by the existence of three conditions. These conditions are the terminal contact temperature is continually maintained at the minimal temperature, (13° C. in the preferred embodiment), the ambient temperature, as measured by the thermistor 36, is greater than some minimal value, such as 20° C. in a preferred embodiment, and the charge current has been charging the battery for at least some minimal value, for example, twenty minutes in one embodiment. If all three of these conditions exist, the microprocessor 14 determines that the contact thermistor wire is broken and enters the problem mode.

Software is provided in the microprocessor 14 to determine whether the contact thermistor wire is broken. This software performs the broken wire test on every new battery pack insertion and charging sequence, and a broken wire flag is set in the software when the three conditions exist. The determination of the contact terminal temperature is continuously evaluated once every second on a specific example. If this temperature measurement is ever not equal to the minimal 13° C. reading, then the software indicates that the wire is not broken. Also, the software determines the charging time to determine when it has reached the minimum time of twenty minutes. And, the ambient temperature is monitored.

The temperature check circuit 34, as described above, is discussed in combination with a particular battery charger suitable for charging various batteries having a number of battery cells. However, it is stressed that the temperature check circuit 34 has a wider range of applications for various other battery chargers having different numbers of cells, and is not particularly limited to the quick-charge battery type charger.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A temperature monitoring device for determining the temperature of a battery pack being charged in a charging device, said charging device including a charging terminal, said monitoring device comprising:

an ambient temperature sensor positioned to sense ambient temperature within the battery charger and providing a temperature signal of the sensed ambient temperature;

a terminal temperature sensor positioned to sense the temperature of the charging terminal and providing a temperature signal indicative of the temperature of the terminal;

a temperature monitoring circuit responsive to the temperature signals from the ambient temperature sensor and the terminal temperature sensor, said temperature monitoring circuit providing output signals indicative of the temperature signals; and controller means responsive to the output signals from the monitoring circuit for determining the temperature of the battery pack based on the temperature signals in accordance with the equation:

$$T_{BATT} = C_1 T_1 + C_2 T_0 + C_3 T_A + C_4$$

where, $T_{BATT}$ is the temperature of the battery pack;

$T_0$ is the temperature of the charging terminal before the battery pack is inserted into the charging device;

$T_1$ is the temperature of the charging terminal after the battery pack is inserted into the charging device; and $T_A$ is the ambient temperature within the battery charger.

2. A battery charger for charging a battery, said battery charger comprising:

a terminal for providing electrical energy to the battery;

first sensing means for sensing the temperature of the terminal;

second sensing means for sensing ambient temperature in the vicinity of the battery charger;

controller means for controlling the battery charger in response to the temperature of the battery which is determined by the controller means in accordance with the equation:

$$T_{BATT} = C_1 T_1 + C_2 T_0 + C_3 T_A + C_4$$

where, $T_{BATT}$ is the temperature of the battery;

$T_0$ is the temperature of the charging terminal before the battery is inserted into the charging device;

$T_1$ is the temperature of the charging terminal after the battery is inserted into the charging device; and $T_A$ is the ambient temperature within the battery charger.

* * * * *